United States Patent [19]

Kiang et al.

[11] Patent Number: 5,300,563
[45] Date of Patent: Apr. 5, 1994

[54] POLYESTER-BASED ADHESIVES AND COMPOSITE STRUCTURES

[75] Inventors: Webster W. Kiang, Lisle; Peter D. Becker, Roselle, both of Ill.

[73] Assignee: Quantum Chemical Corporation, Cincinnati, Ohio

[21] Appl. No.: 951,022

[22] Filed: Sep. 24, 1992

Related U.S. Application Data

[63] Continuation of Ser. No. 559,716, Jul. 30, 1990, abandoned.

[51] Int. Cl.$^5$ .................................. C08F 283/01
[52] U.S. Cl. .................................. 525/42; 525/48; 525/63
[58] Field of Search .................................. 525/42, 48

[56] References Cited

U.S. PATENT DOCUMENTS

| | | | |
|---|---|---|---|
| 3,232,893 | 2/1966 | Salgado et al. | 260/2.5 |
| 3,365,424 | 1/1968 | Dunkel | 260/75 |
| 3,795,716 | 3/1974 | Hokama | 260/860 |
| 3,873,643 | 3/1975 | Wu et al. | 260/878 R |
| 3,882,194 | 5/1975 | Krebaum et al. | 260/878 R |
| 4,038,342 | 7/1977 | Schwartz, Jr. | 260/862 |
| 4,080,316 | 3/1978 | Holda et al. | 260/75 R |
| 4,147,737 | 4/1979 | Sein et al. | 260/835 |
| 4,148,839 | 4/1979 | Fydelor | 260/857 G |
| 4,275,176 | 6/1981 | Login | 525/48 |
| 4,294,751 | 10/1981 | Gardner | 260/40 R |
| 4,311,814 | 1/1982 | Ochsenbein et al. | 525/438 |
| 4,355,155 | 10/1982 | Nelsen | 528/301 |
| 4,379,895 | 4/1983 | Frerking, Jr. et al. | 525/437 |
| 4,469,851 | 9/1984 | Charles et al. | 525/444 |
| 4,487,885 | 12/1984 | Adur et al. | 525/74 |
| 4,506,056 | 3/1985 | Gaylord | 524/445 |
| 4,520,148 | 5/1985 | Golder | 524/100 |
| 4,520,149 | 5/1985 | Golder | 524/100 |
| 4,520,150 | 5/1985 | Golder | 524/100 |
| 4,548,985 | 10/1985 | Yazaki et al. | 525/65 |
| 4,550,130 | 10/1985 | Kishida et al. | 523/436 |
| 4,775,718 | 10/1988 | Broekhuis | 525/69 |
| 4,797,437 | 1/1989 | Golder et al. | 524/100 |
| 4,931,497 | 6/1991 | Engelhardt | 525/42 |

Primary Examiner—Patricia A. Short
Attorney, Agent, or Firm—Marshall, O'Toole, Gerstein, Murray & Borun

[57] ABSTRACT

Adhesives comprising carboxylic acid- or anhydride-grafted elastomeric polyester copolymers, and composite structures made therefrom, are disclosed.

19 Claims, No Drawings

POLYESTER-BASED ADHESIVES AND COMPOSITE STRUCTURES

This is a continuation of U.S. application Ser. No. 07/559,716, filed Jul. 30, 1990, now abandoned.

BACKGROUND OF THE INVENTION

1. Field of the Invention

This invention relates to acid- or anhydride-modified polyester-based adhesives suitable for bonding a variety of substrates, particularly thermoplastic polyester and gas-barrier polymers. The adhesives and composite structures made therewith are particularly useful for making laminated containers and package structures.

More particularly, the invention relates to elastomeric polyester-based adhesives that are particularly suitable for bonding polyester structural layers to layers of ethylene-vinyl alcohol copolymer, polyamide, or other polar gas barrier material to form composite structures that are particularly useful for food and drink packaging purposes.

2. Related Technology

Various modified polyester resin materials have been suggested for a variety of uses.

Salgado, et al., U.S. Pat. No. 3,232,893 (Feb. 1, 1966) discloses acid- or anhydride-modified polyester foams having good strength properties useful for foamed-in-place applications.

Fydelor, U.S. Pat. No. 4,148,839 (Apr. 10, 1979) discloses a polyester or other polymer having a crosslinked carboxylic acid graft on its surface, with chemically bound metal atoms or ions in the surface region thereof, useful as membrane separators and in other applications where plastics or other polymeric materials having reduced liquid solvent or gas permeability are required.

Gaylord, U.S. Pat. No. 4,506,056 (May 19, 1985) discloses a process for preparing a maleic acid- or anhydride-modified polyester in the absence of solvents by grafting maleic anhydride to the polymer at a temperature above the melting point of the polymer in the presence of a free radical initiator. Maleic anhydride homopolymerization is inhibited by the addition of various nitrogen, phosphorus or sulfur compounds.

The foregoing disclosures exemplify a variety of polyester reaction mixtures and uses of the polyester-containing products. Acid- or anhydride-modified elastomeric polyester adhesives and their use in bonding thermoplastic polyester films or sheets to polar gas-barrier films of polymers such as ethylene-vinyl alcohol polymers and the like are not disclosed.

SUMMARY OF THE INVENTION

This invention provides an adhesive composition comprising a graft copolymer of:

(a) a backbone of an elastomeric ethylenically unsaturated polyester copolymer, grafted with (b) an ethylenically unsaturated carboxylic acid or anhydride.

The graft copolymer may be blended with additional, non-grafted polyester copolymer, if desired. The amount of acid or anhydride grafted onto the polyester copolymer is not critical but generally ranges from about 0.1 to about 10 percent by weight, based on the total weight of the adhesive composition. A variety of acid or anhydride grafting monomers can be used. For reasons of cost and availability, maleic anhydride is preferred for most adhesive composition purposes.

The invention also comprehends composite structures comprising a substrate having adhered thereto an adhesive composition as described herein. The substrate can comprise any of a variety of materials including polyolefins, polyesters, copolyesters, polycarbonates, ethylene-vinyl alcohol copolymers, ethylene-vinyl acetate copolymers, polyamides, metals, glass, wood, leather, cellophane, and the like. The invention comprehends composite structures comprising two or more substrates with adjacent pairs of substrates being adhered together by an intervening layer of the inventive adhesive composition, such as a structure of a polyester layer adhered to an ethylene-vinyl alcohol copolymer layer by the inventive adhesive.

The invention also comprehends improved thermoplastic laminated film structures for food container manufacture comprising (1) at least one gas-resistant ("gas barrier") layer of a polar group-containing copolymer, (2) at least one structural layer of a polyolefin, polyester, copolyester, or polycarbonate resin, and (3) an adhesive layer between layers (1) and (2) wherein the adhesive (3) is based on a modified polyester copolymer compatible with the structural layer and contains a reactive functionality for bonding to the gas-barrier layer while also having a rubbery or elastomeric component to relieve stress in the adhesive layer.

Other objects and advantages of the invention will be apparent to those skilled in the art from the following detailed description taken in conjunction with the appended claims.

DETAILED DESCRIPTION OF THE INVENTION

Elastomeric, ethylenically unsaturated polyester copolymers useful as the backbone of the graft copolymer of the invention are well known. Examples of such polyesters include segmented thermoplastic copolyester elastomers containing recurring polymeric long chain ester units derived from phthalic acids and long chain glycols, and short chain ester units derived from phthalic acids and a mixture of butanediol and butenediol.

Preferred polyester copolymer resins useful in the invention are those elastomeric polyester copolymers of terephthalic acid, butanediol (preferably 1,4-butanediol), butenediol (preferably 1,4-butenediol), and polytetramethylene glycol, which are commercially available from Hoechst-Celanese Company (Chatham, N.J.) under the trade designation Riteflex ® polyester. Useful products include, without limitation, Riteflex ® 540, 555, and 372 polyesters.

Riteflex ® polyesters are characterized as having a Shore D hardness of from about 40 to about 72 and an MFR of about 1.0 to about 20 g/10 min., as measured by ASTM D-1238 (2160 g., 220° C.).

Elastomeric ethylenically unsaturated polyester copolymers of this type can be grafted with an ethylenically unsaturated carboxylic acid or anhydride, either before or after addition of optional stabilizers or additives, as such stabilizers and additives do not interfere with the grafting reaction.

The acid or anhydride grafting monomer used to modify the polyester resin can be any of a variety of ethylenically unsaturated acids or anhydrides such as, without limitation, acrylic acid, methacrylic acid, crotonic acid, maleic acid, fumaric acid, itaconic acid, citraconic acid, maleic anhydride, itaconic anhydride, citraconic anhydride and tetrahydrophthalic anhydride, and other unsaturated carboxylic acids or acid anhydrides described in Wu, et al. U.S. Pat. No. 3,873,643 (Mar. 25, 1975); Krebaum, et al. U.S. Pat. No. 3,882,194 (May 6, 1975); and Adur, et al. U.S. Pat. No. 4,487,885 (Dec. 11, 1984), the respective disclosures of which are incorporated herein by reference. For reasons of cost and availability, maleic anhydride is a preferred grafting monomer.

The polyester resin and the acid or anhydride grafting monomer can be mixed and reacted in a variety of known ways, including mixing in a solvent, with or without heating, or by mechanical mixing in the presence of a grafting catalyst such as any of the well known peroxides, such as are described in Hokama U.S. Pat. No. 3,795,716 (Mar. 5, 1974), the disclosure of which is incorporated herein by reference. It is preferred to mix the polyester, the acid or anhydride, and a peroxide catalyst in an extruder reactor at a temperature sufficiently high to melt or soften the polyester. The monomer may be introduced to the reactor separately from the polyester resin, if desired. The polyester reacts with the acid or anhydride in the presence of the peroxide catalyst at a temperature and for a time sufficient to graft a desired amount of the acid or anhydride.

For example, using a commercially available Werner-Pfleiderer ZSK-30 twin-screw extruder reactor with accompanying feed hoppers, peroxide and maleic anhydride supply tanks, and metering apparatus, maleic anhydride has been grafted onto an elastomeric polyester copolymer of terephthalic acid, 1,4-butanediol, 1,4-butenediol and polymethylene glycol (e.g., Riteflex® 540 polyester) in amounts ranging from about 1 to about 4.4 weight percent, based on the weight of the grafted polyester, by feeding the maleic anhydride to the extruder reactor at a rate of between 3 and 6 weight percent, based upon the weight of the starting polyester, while varying the concentration of the peroxide catalyst (di-tert-butylperoxide) from 0 percent to 0.3 percent, based on the weight of the starting polyester.

The acid- or anhydride-modified polyester resins of the invention are particularly useful in adhering layers of polyester structural film materials to gas-barrier polar polymer films, such as ethylene vinyl alcohol or nylon films. The inventive adhesives can be used as the only adhesive between the polyester structural and polar film layers, or they can be diluted with varying amounts of unmodified (non-grafted) polyester sufficient to reduce the cost of the adhesive composition and to provide an acid or anhydride concentration of from about 0.1 to about 200 millimoles per 100 grams of the adhesive composition, preferably from about 0.1 to about 100 millimoles of carboxylic acid or anhydride per 100 grams of the adhesive composition.

The adhesive compositions of the invention can be used in a two-component composite structure comprising a solid substrate having adhered thereto the adhesive composition. The inventive adhesives can also be used in composites comprising more than two solid substrates with adjacent pairs of substrates adhered together by an intervening layer of the adhesive. For example, the inventive adhesives can be used in composites containing polar substrates such as nylon, ethylene-vinyl acetate copolymer (EVA), ethylene-vinyl alcohol copolymer (EVOH), polyvinyl alcohol (PVA), polyester, polyurethane, polycarbonate, metals, etc. In other embodiments, layers of polyolefins (PO) (e.g. polyethylene (PE)), ethylene-vinyl acetate copolymers (EVA), or copolymers of ethylene with other 1-olefins such as propylene, 1-butene, 1-pentene, 1-hexene, and the like, and polypropylene (PP) can be used as substrates. Many combinations can be made by one skilled in the art of using the principles disclosed herein.

Useful methods for forming composite structures include lamination, coextrusion, extrusion lamination, coextrusion coating and other methods of joining dissimilar materials to form composite structures.

Examples of composite structure of the invention include: adhesive/nylon, adhesive/PE, adhesive/polyester, adhesive/EVA, adhesive/EVOH, adhesive/aluminum, adhesive/steel, adhesive/glass, adhesive/wood, adhesive/leather, PO/adhesive/nylon, PO/adhesive/EVOH, adhesive/nylon/adhesive/PO, PO/adhesive/EVOH/adhesive/PO, PO/adhesive/polyester, EVA/adhesive/EVOH, EVA/adhesive/polyester, polyester/adhesive/EVOH, and PO/adhesive/polyester/adhesive/PO.

Examples of other combinations are aluminum/adhesive/aluminum and PO/adhesive/aluminum/adhesive/PO. Other metals such as copper, steel, brass, etc. can also be used. Dissimilar metal examples are: aluminum/adhesive/copper, aluminum/adhesive/steel, aluminum/adhesive/brass, etc. Other useful combinations include those of the type metal/adhesive/polar polymer. Examples of these include aluminum/adhesive/nylon, aluminum/adhesive/EVOH, and steel/adhesive/nylon/adhesive/steel.

The term "polyester" as used to describe substrates in the composite structures of the invention includes homopolymers (essentially comprising the reaction product of a dicarboxylic acid or mixture of dicarboxylic acids or chloride or ester derivative with a diol or derivative thereof) and copolyester copolymers (essentially comprising the reaction product of one or more dicarboxylic acids or derivatives thereof with one or more diols or derivatives thereof). The dicarboxylic acids and the diols referred to above can be aliphatic, aromatic or alicyclic. Examples of such carboxylic acids are terephthalic acid, isophthalic acid, cyclohexanedicarboxylic acids and the like.

Examples of such diols are ethylene glycol, dihydroxypropane(propylene glycol), dihydroxybutane(butylene glycol), benzenedimethanol, cyclohexanedimethanol and the like.

EXAMPLES

The following detailed examples illustrate how the melt flow properties (i.e. melt flow rate, MFR) change with the level of grafted maleic anhydride.

EXAMPLE 1

Nine maleic anhydride-modified polyester copolymers (designated (a)–(i)) using three polyester copolymer starting materials of different hardness were prepared in a Werner-Pfleiderer ZSK-30 30 mm corotating twin-screw extruder-reactor, with varying maleic anhydride and peroxide catalyst feed rates. The maleic anhydride carbonyl group content and melt flow rates of the resulting graft copolymers were measured.

The polyester materials were copolymers of 1,4-butanediol, 1,4-butenediol, polytetramethylene glycol, and terephthalic acid. The extruder was characterized by a length/diameter ratio of 36:1 and the following temperature profile:

| Zone | 1 | 2 | 3 | 4 | 5 | 6 | 7 | 8 | 9 (Die) |
|---|---|---|---|---|---|---|---|---|---|
| Temp. (°C.) | 190 | 200 | 200 | 200 | 220 | 220 | 220 | 200 | 190 |

The extruder screw speed was maintained at 300 rpm. The polymer feed rate was about 13.5 pounds per hour. Nitrogen gas was blown into Zone 1 and out through the unheated feed port to purge oxygen from the system. Di-tert-butyl peroxide was fed into Zone 3 at a rate specified in Table I, below. Maleic anhydride was fed into Zone 4 as a liquid at the rate specified in Table I. The product was extruded as strands, quenched in a water bath, and pelletized.

Melt flow for Examples 1(a) and (b) was measured at 240° C., 2160 g weight. Melt flow for all others was measured at 220° C., 2160 g weight. Melt flow is expressed as g/10 min.

Maleic anhydride and peroxide feed rates are based on weight of polyester starting material.

The maleic anhydride content in product copolymers was determined by infrared spectroscopy.

The base polyester for Examples 1(a) and 1(b) was a polyester copolymer of 1,4-butanediol, 1,4-butenediol, polytetramethylene glycol and terephthalic acid, obtained from Hoechst-Celanese Company of Chatham, New Jersey, under the trade name Riteflex ® 372 polyester.

The base polyester of Examples 1(c) to 1(f) was Riteflex ® 555 polyester from Hoechst-Celanese.

The base polyester of Examples 1(g), 1(h) and 1(i) was Riteflex ® 540 polyester from Hoechst-Celanese.

TABLE I
MODIFIED POLYESTER COPOLYMERS

| | Base Polyester | | Wt. % Maleic Anhydride | Wt. % Peroxide Feed | Product Properties | |
|---|---|---|---|---|---|---|
| | Hardness Shore D | Melt Flow | | | Wt. % Maleic Anhydride | Melt Flow |
| a | 72 | 17 | 4 | 0.15 | 1.96 | 23.8 |
| b | 72 | 17 | 4 | 0.3 | —* | 9.4 |
| c | 55 | 12 | 3.5 | 0.3 | 3.22 | 1.3 |
| d | 55 | 12 | 6 | 0.3 | 3.45 | 1.3 |
| e | 55 | 12 | 6 | 0.15 | 2.57 | 2.4 |
| f | 55 | 12 | 3.5 | 0.15 | 2.35 | 2.2 |
| g | 40 | 19 | 4.4 | 0.2 | 4.28 | 5.3 |
| h | 40 | 19 | 4.4 | 0.1 | 3.64 | 33.8 |
| i | 40 | 19 | 4.4 | 0 | 1.03 | 37 |

*Not measured; could not press film for measurement due to nonuniformity of material.

EXAMPLE 2

Various adhesive compositions of Example 1 were tested for adhesion to ethylene-vinyl alcohol and polyethylene terephthalate films to illustrate the effect on adhesion of varying the proportion of the modified polyester materials in blends with various proportions of the non-modified polyester starting materials and a third polyester elastomer.

The modified polyester resins of Example 1 were tested both alone and in blends as adhesives for ethylene-vinyl alcohol copolymer and polyethylene terephthalate. Blends samples were prepared in 40 gram batches using a lab scale mixer at 400° F. and mixing times of 10 minutes at 120 rpm. A nitrogen gas purge was used to prevent oxidation of the polymer. The samples were then compression molded into films 6±1 mil in thickness. These films were then cut into strips and heat sealed to either ethylene-vinyl alcohol copolymer or polyethylene terephthalate layers. The heat seal conditions were 450° F. for 3 seconds with 40 psi bar pressure. After heat sealing, the adhesion was measured on a one-inch wide strip by pulling the free ends apart with a tensile testing machine. The crosshead travel was set at 10 inches per minute and the heat sealed "tail" was held by hand at a 90 degree angle from the travel of the crosshead. The results are recorded as adhesion in pounds per inch width in Table II:

TABLE II

| | | | | Adhesion to: | |
|---|---|---|---|---|---|
| Non-Modified Polyester | Wt. % | Modified Polyester | Wt. % | EVAL H 101[2] | PET 9902[3] |
| PETG 6763[1] | 90 | Example 1c | 10 | 0 lb/in | 0.2 lb |
| PETG 6763 | 70 | Example 1c | 30 | 0 | 0.3 |
| — | 0 | Example 1c | 100 | unable to press film | |
| — | 0 | Example 1f | 100 | 0.4 | 0.7 |
| Riteflex ® 555 | 100 | — | | 0 | 1.1 |
| Riteflex ® 555 | 90 | Example 1c | 10 | 0.1 | 1.4 |
| Riteflex ® 555 | 70 | Example 1c | 30 | 0.4 | 0.9 |
| Riteflex ® 555 | 70 | Example 1f | 30 | 0.2 | 3.4 |
| Riteflex ® 555 | 50 | Example 1f | 50 | 0.8 | 0.9 |
| Riteflex ® 540 | 100 | — | | 0.1 | CNS[4] |
| Riteflex ® 540 | 90 | Example 1f | 10 | 4.3 | —[5] |
| Riteflex ® 540 | 85 | Example 1f | 15 | 5.3 | 5.9 |
| Riteflex ® 540 | 80 | Example 1f | 20 | 5.0 | —[5] |
| Riteflex ® 540 | 70 | Example 1f | 30 | 5.2 | 4.5 |
| Riteflex ® 540 | 50 | Example 1f | 50 | 2.0 | 2.0 |
| Riteflex ® 540 PETG 6763 | 55) 30) | Example 1f | 15 | 1.2 | 2.2 |
| Riteflex ® 540 PETG 6763 | 30) 55) | Example 1f | 15 | 0.5 | 0.7 |
| Riteflex ® 540 PET 9902 | 55) 30) | Example 1f | 15 | 0.2 | 0.7 |
| Riteflex ® 540 PET 9902 | 30) 55) | Example 1f | 15 | 0 | 0.2 |

Footnotes:
[1] PETG 6763 is a polyethylene terephthalate modified with ethylene glycol from Eastman Chemical Co.
[2] EVAL H 101 is an ethylene/vinyl alcohol polymer comprising 38 mole % ethylene units. MI = 1.5.
[3] PET 9902 is a polyethylene glycol terephthalate from Eastman Chemical Co. with an intrinsic viscosity of 0.85.
[4] CNS means that the sheets could not be separated.
[5] Not measured. Expected adhesion >4 lb/in.

EXAMPLE 3

A modified polyester composition of the invention was tested in coextruded five-layer composite structures, and the adhesion properties of the resulting structures were evaluated.

The adhesive compositions of Table III, below, were melt compounded in an extruder as in Example 1 and the product was chopped into pellets. The pellets were then melted and extruded with polyethylene terephthalate (PET) and ethylene vinyl alcohol copolymer (EVOH) into a five-layer sheet with the following structure:

layer construction: PET/adhesive/EVOH/adhesive/PET layer thickness (mils): 6.6/1.9/4.3/2.1/6.8 Three one-inch diameter single-screw extruders were connected to a combining feedblock and a die. The melt temperatures of the materials were as follows:

PET, 538° F.; adhesive layer, 485° F.; EVOH, 413° F. The results of adhesion testing are shown in Table III below:

TABLE III

| Blending Resin | Wt. % | Modified Polyester | Wt. % | Adhesion (lb/in) |
|---|---|---|---|---|
| A | 85 | Example 1h | 15 | 5.7 |
| A | 85 | Example 1f | 15 | 4.1 |
| A | 85 | Example 1b | 15 | 0.5 |
| B | 85 | Example 1f | 15 | 0.1 |
| C | 85 | Example 1h | 15 | 0.0 |
| C | 85 | Example 1b | 15 | 0.1 |

Blending resins:
A - Riteflex ® 540 polyester copolymer; Shore D hardness 40, melt flow 19 (measured at 2160 g., 220° C.)
B - Riteflex ® 555 polyester copolymer; Shore D hardness 55, melt flow 12 (measured at 2160 g., 220° C.)
C - Riteflex ® 372 polyester copolymer; Shore D hardness 72, melt flow 17 (measured at 2160 g., 240° C.)

The composite structures of the invention can be used to manufacture many different useful articles. They can be used as packaging films, blow molded bottles, coextruded sheets which can be thermoformed into containers, coatings on glass bottles or wood or metal, or to join two similar or dissimilar metals.

The foregoing detailed description is given for clearness of understanding only, and no unnecessary limitations should be understood therefrom, as modifications within the scope of the invention will be apparent to those skilled in the art.

We claim:

1. An adhesive composition comprising a graft copolymer of:
   (a) an elastomeric ethylenically unsaturated polyester copolymer including recurring ester units along the chain thereof, grafted with
   (b) a grafting monomer consisting essentially of an acid or anhydride selected from the group consisting of crotonic acid and ethylenically unsaturated dicarboxylic acids and anhydrides, said grafting monomer comprising up to about 10 wt. % of said graft copolymer.

2. The adhesive composition of claim 1 wherein said grafting monomer comprises between about 0.1 and about 10 wt. % of said graft copolymer.

3. The adhesive composition of claim 1 wherein said grafting monomer is a dicarboxylic acid or anhydride selected from the group consisting of maleic acid, fumaric acid, itaconic acid, citraconic acid, maleic anhydride, itaconic anhydride, citraconic anhydride and tetrahydrophthalic anhydride.

4. The adhesive composition of claim 1 wherein said grafting monomer is maleic anhydride.

5. An adhesive composition of claim 1 wherein said polyester copolymer (a) is a polycondensation product of terephthalic acid, butanediol, butenediol and polytetramethylene glycol.

6. The adhesive composition of claim 5 wherein said polyester copolymer (a) has a Shore D hardness of from about 40 to about 72, an MFR of about 10 to 20 g/10 min. as measured by ASTM D-1238, said grafting monomer (b) is maleic anhydride, and said maleic anhydride is present in said composition in grafted form in a concentration of from about 0.1 to about 200 millimoles per 100 grams of said composition.

7. An adhesive composition comprising a graft copolymer of:
   (a) an elastomeric ethylenically unsaturated polyester copolymer including recurring ester units along the chain thereof, grafted with
   (b) a grafting monomer consisting essentially of an acid or anhydride selected from the group consisting of crotonic acid, maleic acid, fumaric acid, itaconic acid, citraconic acid, and ethylenically unsaturated anhydrides said grafting monomer comprising up to about 10 wt. % of said graft copolymer.

8. The adhesive composition of claim 7 wherein said grafting monomer comprises between about 0.1 and about 10 wt. % of said graft copolymer.

9. The adhesive composition of claim 7 wherein said grafting monomer comprises between about 0.1 and about 4.4 wt. % of said graft copolymer.

10. The adhesive composition of claim 7 wherein said anhydride is selected from the group consisting of maleic anhydride, itaconic anhydride, citraconic anhydride, and tetrahydrophthalic anhydride.

11. The adhesive composition of claim 7 wherein said grafting monomer is maleic anhydride.

12. An adhesive composition of claim 7 wherein said polyester copolymer (a) is a polycondensation product of terephthalic acid, butanediol, butenediol and polytetramethylene glycol.

13. The adhesive composition of claim 12 wherein said polyester copolymer (a) has a Shore D hardness of from about 40 to about 72, an MFR of about 10 to 20 g/10 min. as measured by ASTM D-1238, said grafting monomer (b) is maleic anhydride, and said maleic anhydride is present in said composition in grafted form in a concentration of from about 0.1 to about 200 millimoles per 100 grams of said composition.

14. An adhesive composition comprising a graft copolymer of:
   (a) an elastomeric ethylenically unsaturated polyester copolymer including recurring ester units along the chain thereof, grafted with
   (b) a grafting monomer selected from the group consisting of maleic anhydride, itaconic anhydride, citraconic anhydride, and tetrahydrophthalic anhydride, said grafting monomer comprising up to about 10 wt. % of said graft copolymer.

15. The adhesive composition of claim 14 wherein said grafting monomer comprises between about 0.1 and about 10 wt. % of said graft copolymer.

16. The adhesive composition of claim 14 wherein said grafting monomer comprises between about 0.1 and about 4.4 wt. % of said graft copolymer.

17. The adhesive composition of claim 14 wherein said grafting monomer is maleic anhydride.

18. An adhesive composition of claim 14 wherein said polyester copolymer (a) is a polycondensation product of terephthalic acid, butanediol, butenediol and polytetramethylene glycol.

19. The adhesive composition of claim 18 wherein said polyester copolymer (a) has a Shore D hardness of from about 40 to about 72, an MFR of about 10 to 20 g/10 min. as measured by ASTM D-138, said grafting monomer (b) is maleic anhydride, and said maleic anhydride is present in said composition in grafted form in a concentration of from about 0.1 to 200 millimoles per 100 grams of said composition.

* * * * *